Figure 1:
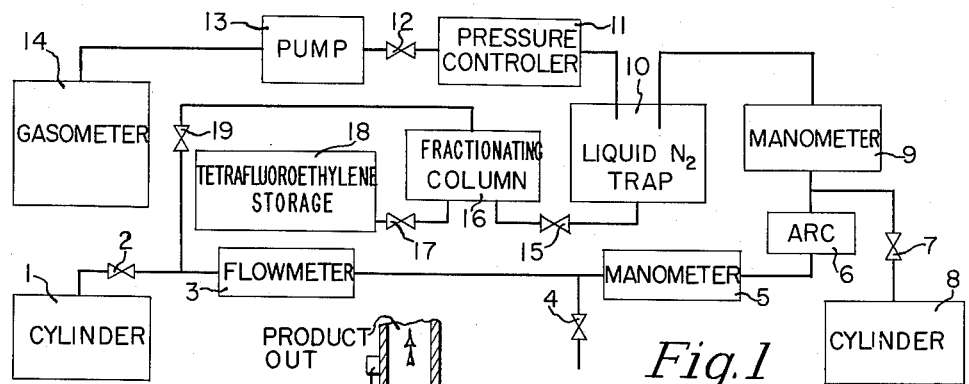

Nov. 29, 1955   M. W. FARLOW ET AL   2,725,410
PREPARATION OF FLUORINE-CONTAINING COMPOUNDS
Filed March 29, 1955   2 Sheets-Sheet 1

INVENTORS
MARK WENDELL FARLOW
EARL LEONARD MUETTERTIES
BY Ambrose McAleny
ATTORNEY

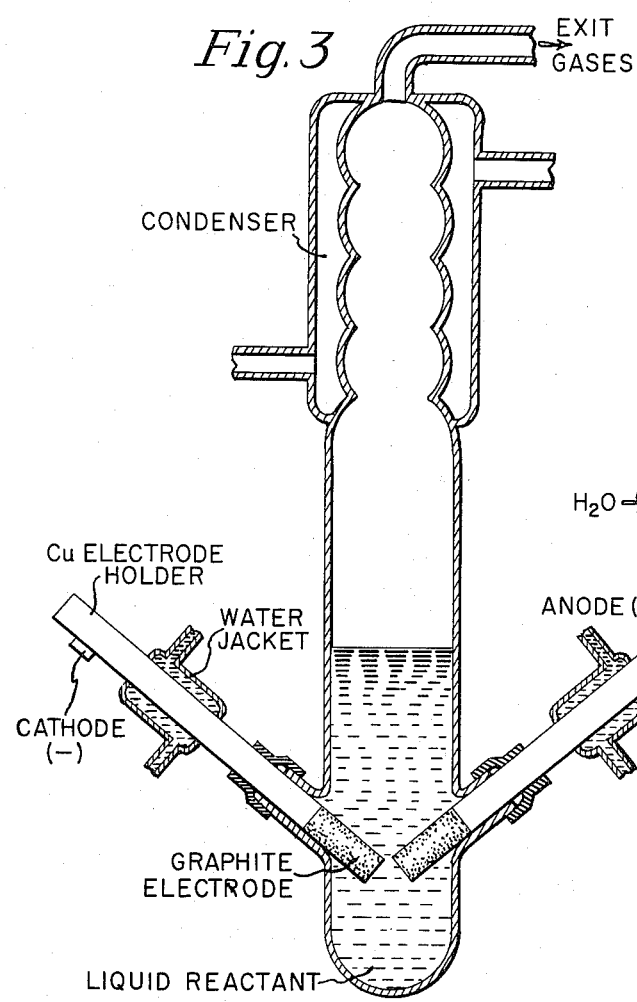
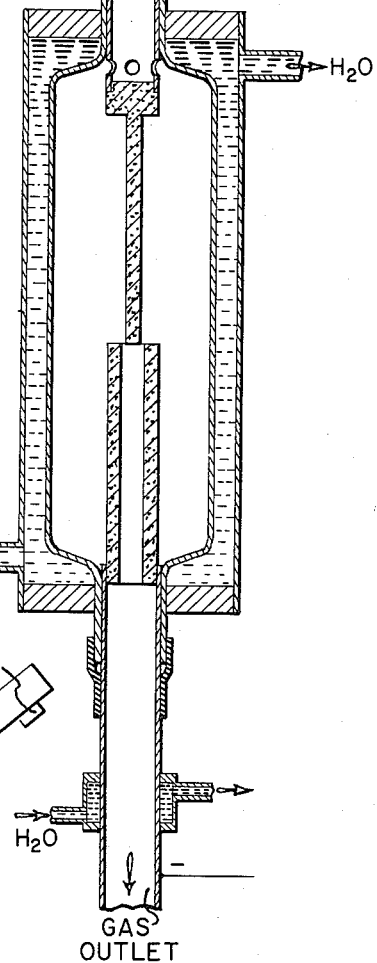

United States Patent Office 2,725,410
Patented Nov. 29, 1955

2,725,410

PREPARATION OF FLUORINE-CONTAINING COMPOUNDS

Mark Wendell Farlow, Wilmington, and Earl Leonard Muetterties, Hockessin, Del., assignors to E. I. du Pont de Nemours and Company, Wilmington, Del., a corporation of Delaware Application March 29, 1955, Serial No. 497,604

8 Claims. (Cl. 260—653)

This invention relates to a new process for preparing fluorine-containing compounds, particularly fluorocarbons, and other related products formed simultaneously therewith. This application is a continuation-in-part of our copending patent application S. N. 420,472, filed April 1, 1954.

Compounds containing only fluorine and carbon, which are known as fluorocarbons, possess considerable utility in many fields of applied chemistry, for example, as refrigerants, dielectric fluids, intermediates for polymeric materials, propellants in aerosol compositions, etc. One of these fluorocarbons, tetrafluoroethylene, has achieved commercial success in the form of its polymers. However, wider uses for tetrafluoroethylene and other fluorocarbons would be attained were there more economical methods for their preparation.

The present invention is directed to a process for synthesizing fluorocarbons, especially tetrafluoroethylene, which comprises heating carbon at a temperature of at least 1500° C. with a compound composed of carbon, fluorine, and at least one other element, the atomic ratio of fluorine to other element or elements being at least 1:1, said compound containing no element other than hydrogen, carbon, fluorine, chlorine and bromine. A preferred group of these compounds having the said ratio of fluorine to other element or elements comprises the fluorochloroalkanes, fluorobromoalkanes, fluoroalkanes, fluorochloroalkenes, fluorobromoalkenes, and fluoroalkenes.

The reaction gives a mixture of products, the principal fluorocarbons being tetrafluoroethylene and carbon tetrafluoride, with smaller amounts of hexafluoroethane. When the initial reactant is a fluorochloro- or fluorobromo-compound, substantial quantities of different fluorochloro- or fluorobromo-compounds, respectively, are also produced. These latter can, of course, be recycled to the reaction zone.

The process of this invention can be carried out in various ways. In one embodiment, the vaporized compound of carbon, fluorine, and at least one other element, in which the ratio of fluorine to the other element is at least 1:1, can be passed through a tube made of carbon or of other refractory material packed with carbon heated at a temperature of at least 1500° C. The reactor tube can be heated in any suitable manner, e. g., by an electric resistance or induction furnace. The gaseous reaction products can then be passed through cold condensers, or traps, to isolate liquid reaction products. When tetrafluoroethylene is the desired fluorocarbon, it is preferable to cool the hot reaction products rapidly to a temperature below 400° C. The time of transition from the reaction temperature to 400° C. should not exceed one second and is preferably in the range of 0.001 to 0.1 second to obtain best yields of tetrafluoroethylene. The liquefied fluorocarbons and any unreacted starting material can be separated by fractional distillation in efficient fractionating columns. Optionally, the crude reaction products can be passed through aqueous solutions of an alkali, e. g., sodium hydroxide, to cool the reaction products and to absorb any acidic by-products. Moreover, it is sometimes desirable to employ an acceptor for free halogen, such as sodium iodide.

A preferred embodiment of the invention involves passing a compound of carbon, fluorine, and at least one other element in which the ratio of fluorine to the other element is at least 1:1 through the arc produced by passing an electric current between carbon electrodes where the temperature is generally estimated to be in the range of 2500° to 4000° C. In this method, the reaction products can be cooled, purified, and isolated as described previously.

Another embodiment of the process of this invention which is particularly useful when the starting fluorine-containing carbon compound is liquid at ordinary temperatures consists in submerging a carbon arc in the liquid fluorine-containing carbon compound. In this particular process the fluorine-containing reactant is vaporized by the arc, reacts with the carbon of the arc, and is then very rapidly cooled by the surrounding liquid reactant.

To obtain most efficient operation of this process, it is desirable to recycle any unreacted starting material and any undesired fluorocarbon products. Thus, to obtain highest yields of tetrafluoroethylene from the reaction of carbon with a fluorine-containing compound such as, for example, dichlorodifluoromethane, any unreacted dichlorodifluoromethane and the fluorocarbon by-products from the first pass through the heated reaction zone are recycled. The fluorocarbon by-products having one to two carbons are in turn converted to tetrafluoroethylene during the recycling step by a process described in application Serial No. 477,678, filed December 27, 1954, by M. W. Farlow, now U. S. Patent 2,709,192, and the fluorocarbon by-products having three or more carbon atoms are converted to tetrafluoroethylene during the recycling step by a process described in application Serial No. 390,461, filed November 6, 1953, by M. W. Farlow, now U. S. Patent 2,709,182.

The reaction temperature must be at least 1500° C. and can be high as can practically be obtained by known means. Extremely high temperatures, i. e., above 2500° C., such as can be achieved by the use of a carbon arc, represent a preferred embodiment since they lead to higher conversions per pass and increase the proportions of the highly valuable tetrafluoroethylene in the reaction product. The relative proportions of the two reactants are not critical insofar as the course of the reaction is concerned. However, it is desirable for economic reasons to have the carbon present in excess in order to utilize to the greatest extent the more expensive fluorine-containing carbon compound.

The pressure at which the reaction is carried out can be varied over wide limits. Satisfactory results can be obtained at pressures ranging from as low as 1 mm. of mercury absolute, or lower, up to superatmospheric pressures. Subatmospheric pressures are preferable when fluorohalo compounds are used at reactants since low pressures minimize the reaction of free halogen with fluorocarbon products. Atmospheric and superatmospheric pressures are useful when it is desired to carry out the reaction with submerged electrodes.

The fluorine-containing carbon compounds used as reactant in the process of this invention need not be rigorously pure. Commercially available materials or compounds made by known methods are entirely suitable. Anhydrous reactants are not essential; however, it is preferable to use reactants substantially free of moisture.

Any form of carbon, either amorphous or crystalline, is suitable for use in the process of this invention. Thus, there can be used coal, graphite, diamond, charcoal, and the various forms of carbon black, such as lamp black, acetylene black, bone black, etc. The powdered forms of carbon are, of course, used as packings in the form of pellets or on supports, such as coke. In general, best results are obtained with active carbon, of which many well-known varieties are available commercially. In general, active carbon is very finely divided porous carbon having a total surface area of at least 20 square meters per gram (Hassler, "Active Carbon," Chemical Publishing Company, 1951, page 127). When a carbon arc is used in the process, the activity or state of subdivision of the carbon is apparently of no consequence, but the carbon must, of course, possess sufficient conductivity.

The invention is described in greater detail in the following examples, which illustrate the reaction of the fluoride with the carbon in an electric arc.

Figure 2:
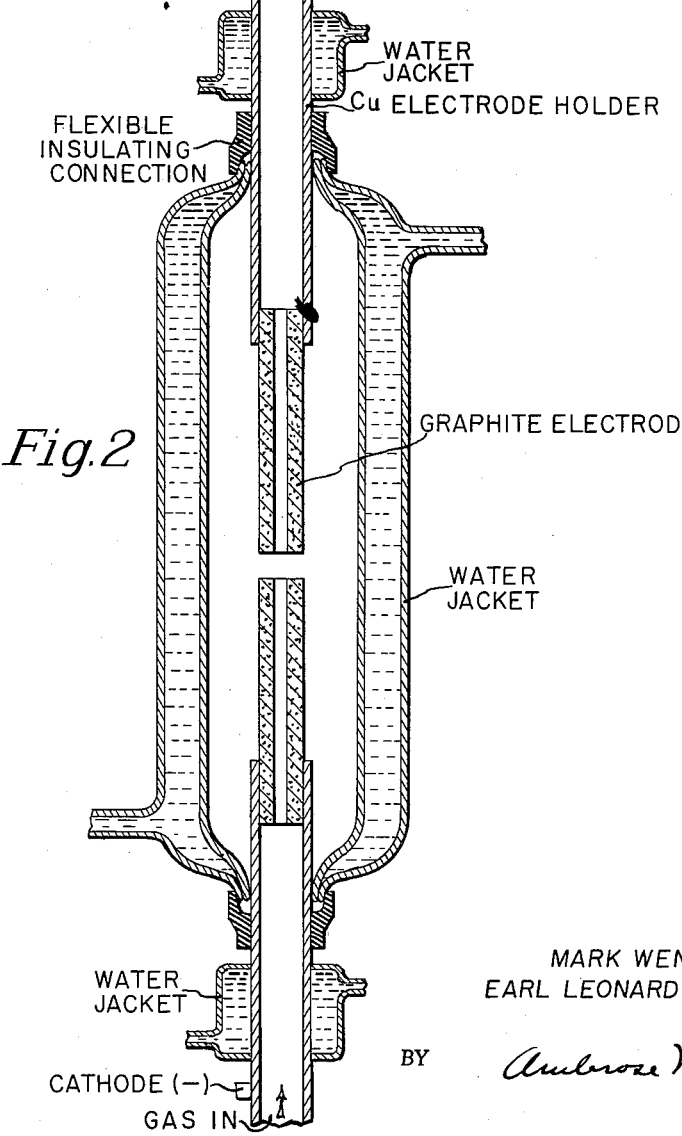

A flow sheet of the equipment and process used in reacting a compound of carbon, fluorine, and at least one other element with the electrodes of a carbon arc is shown in Figure 1. A detail of an arc used with gaseous reactants is shown in Figure 2. A detail of a type of apparatus having a carbon arc submerged in liquid fluorine-containing reactant is shown in Figure 3. Another form of apparatus which can be used is shown in Figure 4.

Referring to Figure 1, the gas lines are of copper tubing. In a typical operation the compound of carbon, fluorine, and another element is contained in cylinder or tank 1. Valves 2, 4, 15, and 19 are closed, and valves 7 and 12 are opened. The apparatus is evacuated by means of pump 13 to remove the air, trap 10 is cooled with liquid nitrogen, valve 7 is closed, argon (or other inert gas) is admitted through valve 4 to the desired operating pressure, and pressure controller 11 is set to maintain that desired pressure. The arc 6 is struck, the reactant gas is passed through the arc at the desired rate (flowmeter 3) and the product is condensed in trap 10, except noncondensable gases which pass through controller 11, pump 13, and into gas reservoir 14. During operation the arc inlet pressure (manometer 5) will be appreciably higher than the exit pressure (manometer 9) because of the constriction involved in the arc passages. When it is desired to stop the reaction, the arc current is cut off, valves 2 and 12 are closed, valve 7 is opened, cylinder 8 is cooled with liquid nitrogen, and trap 10 is allowed to warm to room temperature, and the volatile product is distilled into cylinder 8. Finally, if desired, cylinder 8 can be pumped to remove traces of argon, or other noncondensables, after which the cylinder valve 7 is closed and the product is allowed to warm to room temperature.

In continuous operation where unreacted starting material and fluorocarbon by-products are recycled, the trap 10 is connected through valve 15 to fractionating column 16 which separates, as far as possible, the tetrafluoroethylene from the reaction products of the arc, sends the tetrafluoroethylene of greater or less purity, depending on the grade desired, to tetrafluoroethylene storage 18 and returns the remaining starting material and fluorocarbon by-products through valve 19 and flowmeter 3 to the arc 6. If desired, the by-products before being sent back into the arc 6 can be passed through an alkaline scrubber to remove acidic gases, such as carbon dioxide.

A detail of an arc suitable for use with gaseous reactants is shown in Figure 2. The electrodes consist of graphite cylinders. The water jackets are made of electrically nonconductive material, or if they are made of electrically conductive material they are insulated from the electrode holders. The arc is struck by contacting the two electrodes through manipulation of one of the two flexible rubber connections, care being taken to avoid contact with uninsulated portions of the apparatus. Thereafter the electrode gap is controlled to effect the requisite current. Either direct or alternating current can be applied across the electrodes at widely varying voltages. In the case of alternating current, the frequency of the current can be varied over a wide range. Good results are obtained when a direct current of 10 to 30 amperes at 10 to 50 volts is employed. However, the process is not limited to the use of this narrow range of amperage and voltage.

Referring to Figure 3, a detail is given of apparatus having a carbon arc submerged in a liquid reactant. In this type of apparatus the pyrolysis products are rapidly cooled to the temperature of the refluxing liquid reactant. In this apparatus the arc is operated in the same manner as described in the preceding paragraph.

Referring to Figure 4, a detail is given of a type of carbon arc equipment which is very efficient and which gives very high conversions to fluorocarbons of the compounds of carbon, fluorine and at least one other element as defined previously. In this equipment one electrode is hollow and the other is solid. The gaseous reactants enter the reaction chamber through holes in the upper electrode holder, pass around the solid electrode and between the adjacent ends of the two electrodes and then out through the center of the hollow electrode. When the solid electrode is smaller in diameter than the inner diameter of the hollow electrode, the arc can be operated with the end of the solid electrode a short distance above the end of the hollow electrode, parallel with the end of the hollow electrode, or extending into the center of the hollow electrode. The exact position selected is dependent on the particular reactant being passed through the arc, the position being chosen which provides the best arc under operating conditions. The relative positions of the two electrodes can be changed, if desired, during operation. This is sometimes necessary to maintain the optimum arc. The solid electrode can also be larger in diameter than the inner diameter of the hollow electrode. If desired, it can even be larger than the outer diameter of the hollow electrode. The solid electrode is designated as the anode in the drawing; however, it can be the cathode and the hollow electrode can be the anode, if desired.

*Example 1.*—1,2-dichloro-1,1,2,2-tetrafluoroethane is passed through a carbon arc produced by graphite electrodes of 0.1 inch internal diameter (Figures 1 and 2) at a rate of 63.6 grams per hour, an arc pressure of 0.04 to 0.10 atmosphere, absolute. The arc is operated at 25 volts direct current and 18 amperes. The products are cooled from arc temperature to below 400° C. in less than about 1.0 second. The gaseous reaction product contains about 20 mole per cent tetrafluoroethylene, 5 mole per cent tetrafluoromethane, 30 mole per cent monochlorotrifluoromethane, 20 mole per cent dichlorodifluoromethane, and 20 mole per cent of unchanged 1,2-dichloro-1,1,2,2-tetrafluoroethane.

*Example 2.*—Monochloropentafluoroethane is passed through a carbon arc under the conditions given in Example 1 except that the flow rate is 60 grams per hour. The gaseous reaction product contains about 15 mole per cent tetrafluoroethylene, 20 mole per cent tetrafluoromethane, 10 mole per cent hexafluoroethane, 30 mole per cent monochlorotrifluoromethane, and 20 mole per cent unchanged monochloropentafluoroethane.

*Example 3.*—Dichlorodifluoromethane is passed through a carbon arc under the conditions given in Example 1 except that the flow rate is 3 grams per hour and the reaction gases after quenching are passed through granular sodium iodide. The gaseous reaction product contains about 5 mole per cent of tetrafluoroethylene, 5 mole per cent carbon tetrafluoride, 20 mole per cent monochlorotrifluoromethane, 5 mole per cent 1,2-dichloro-1,1,2,2-tetrafluoroethane, and about 65 mole per cent of unchanged dichlorodifluoromethane.

*Example 4.*—Monochlorotrifluoromethane is passed through a carbon arc under the conditions given in Example 1 except that the flow rate is 30 grams per hour and the gaseous reaction product after quenching is passed through granular sodium iodide. The gaseous reaction product contains about 5 mole per cent tetrafluoroethylene, 25 mole per cent carbon tetrafluoride, 15 mole per cent dichlorodifluoromethane, and about 55 mole per cent of unchanged monochlorotrifluoromethane.

The examples have illustrated this invention by the pyrolysis of particular fluorine-containing compounds in the presence of a carbon arc. However, the process can be carried out very satisfactorily in an induction-heated graphite tube furnace such as that disclosed in the co-pending application of M. W. Farlow, S. N. 477,678, filed December 27, 1954, now U. S. Patent 2,709,192. This type of furnace is well suited to operation at 1500° to 2500° C. The manner in which the various elements in the fluorine-containing carbon compound are joined is not critical. At the temperature at which the reaction is carried out, fluorocarbons, including tetrafluoroethylene, are formed. Consequently, a wide variety of fluorine-containing carbon compounds are operable. A group of compounds which can be employed satisfactorily is made up of those which contain at least one carbon atom and an insufficient number of fluorine atoms per molecule to be a fluorocarbon, said number being, however, at least twice the number of carbon atoms in the molecule. Specific examples of compounds that can be used in the process of this invention include: difluoromethane, trifluoromethane, trifluorochloromethane, dichlorodifluoromethane, dibromodifluoromethane, trifluorobromomethane (pentafluoroethyl)benzene, bis(trifluoromethyl)benzene, dichloromonofluorobis(trifluoromethyl)benzene, dichlorotetradecafluoroheptane, monochloropentadecafluoroheptane, monochlorotrifluoroethylene, trifluoroethylene, 1,2,2-trichloro-1,1,2-trifluoroethane, 1,2-dibromoperfluoropropane, and 1,2-dichlorohexafluorocyclobutane.

We claim:

1. A process for the preparation of fluorocarbons which comprises heating carbon with a reactant composed of carbon, fluorine and at least one other element, the atomic ratio of fluorine to such other element or elements being at least 1:1, and continuing said heating at a temperature of at least 1500° C. until a fluorocarbon is produced, and separating the said fluorocarbon from the resulting mixture, said reactant containing no element other than hydrogen, carbon, fluorine, chlorine, and bromine.

2. A process for the preparation of fluorocarbons which comprises heating carbon with a reactant composed of carbon, fluorine and chlorine, the atomic ratio of fluorine to chlorine being at least 1:1, and continuing said heating at a temperature of at least 1500° C. until a fluorocarbon is produced, and separating the said fluorocarbon from the resulting mixture.

3. Process of claim 2 wherein the temperature is at least 2500° C.

4. Process of claim 3 wherein the said reactant is dichlorodifluoromethane.

5. Process of claim 3 wherein the said reactant is monochlorotrifluoromethane.

6. Process of claim 3 in which the said reactant is passed through a carbon arc at a temperature of 2500° to 4000° C.

7. Process of claim 3 wherein the said arc employs a current of 10 to 30 amperes at 10 to 50 volts.

8. Process of claim 6 wherein said reactant is conducted through a carbon arc at a pressure of 0.04 to 0.1 atmosphere, and the resulting product is cooled from arc temperature to below 400° C. in less than one second, whereby a mixed product containing tetrafluoroethylene is produced, and thereafter separating tetrafluoroethylene from the resulting mixture.

References Cited in the file of this patent

UNITED STATES PATENTS 2,670,389    Passino et al. _____ Feb. 23, 1954

OTHER REFERENCES

Simons et al.: J. A. C. S., vol. 61 (1939), pages 2962–2966.